July 31, 1928.
C. W. HALL
1,678,640
FITTING FOR AIRCRAFT AND THE LIKE
Filed July 2, 1924
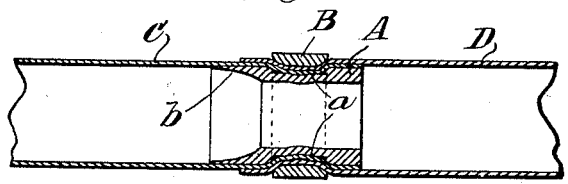
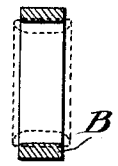
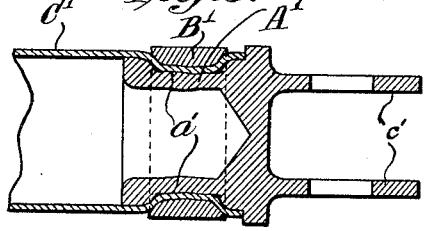
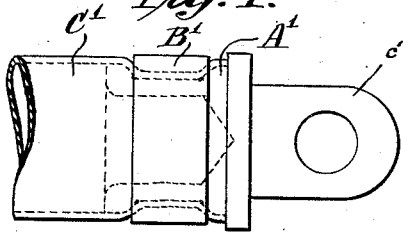
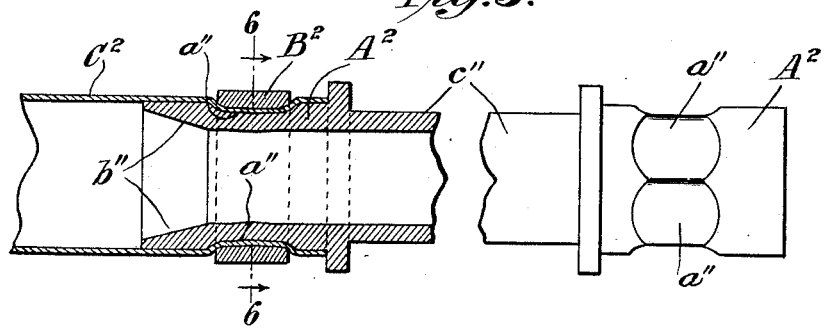
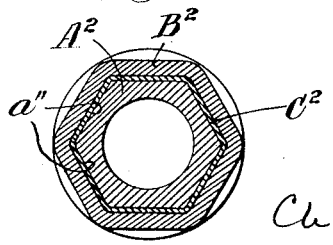
Charles Ward Hall
INVENTOR
BY W. B. Whitney
ATTORNEY Patented July 31, 1928.

1,678,640

UNITED STATES PATENT OFFICE.

CHARLES WARD HALL, OF LARCHMONT, NEW YORK.

FITTING FOR AIRCRAFT AND THE LIKE.

Application filed July 2, 1924. Serial No. 723,672.

The present invention relates more particularly to an aircraft fitting, although not limited in its use to aircraft construction, and, specifically, to a joint fitting by which the end of a thin-walled tube is joined either to the end of another similar tube or to some other structural part.

My new fitting comprises, essentially, an inner member, preferably of metal and of hollow section with relatively thick walls, which fits telescopically into the end of the tube to be joined and intermediate its bearing length is provided in its outer surface with a circumferential depression or series of depressions, according to conditions, and an outer metallic member or annulus which is of a size and shape to be slipped over the end of the tube and which, after the inner member has been inserted in the tube, is slipped into position and then compressed and reduced in diameter, by swaging, squeezing, or otherwise, to thereby force the wall of the tube into and securely hold it seated against the bottom and sides of the depression or depressions in the inner member.

Where the ends of two tubes are to be joined together, the inner joint fitting may be a short hollow cylinder with a single circumferential depression or series of depressions in its outer surface and the ends of the tubes, telescoped one into the other, may both be secured thereto by the ring or outer fitting, or a longer inner fitting may be provided with a circumferential depression or series of depressions at each of its ends and the ends of the tubes may be secured thereto, one to each end, by separate rings. If a tube is to be joined to some other structural part, the inner joint fitting may either be formed integral with such other part or carry at its outer end an integral lug or lugs by which it may be attached thereto. In case the joint is to transmit axial stresses only, stresses of tension or compression, the circumferential depression in the outer surface of the inner fitting is preferably a simple annular groove of uniform depth and with rounded edges, but where the joint has to transmit torsional stresses, either wholly or in part, the depression or depressions should be of such a character as to provide a bearing surface for the wall of the tube which is noncircular, preferably polygonal, in cross-section. In either case, whether the depressed bearing surface is or is not circular in cross-section, the end of the tube is secured therein by the same annulus and in the same way.

Several embodiments of the invention are shown, by way of illustration and not of limitation, in the accompanying drawings, in which—

Figure 1 is a view showing in longitudinal section the ends of two tubes joined together by means of my new fitting; Fig. 2 is a similar view of the ring or other fitting as constructed and before it has been applied to the joint; Figs. 3 and 4 are views showing, in longitudinal section and in side elevation respectively, the end of a tube joined to a fitting the inner member of which is provided with integral lugs whereby it may be pivotally connected to some structural part; Fig. 5 is a view of a modified form of joint fitting, designed to resist torsional as well as axial stresses, showing in longitudinal section one end of the inner member and of a tube joined thereto and in side elevation the other end of the inner member alone; and Fig. 6 is a section on the line 6—6 of Fig. 5.

Referring first to Figs. 1 and 2, which illustrate a form of joint intended to resist tension or compression stresses and some bending stress at one end, A indicates the hollow inner fitting, provided with annular groove $a$, B indicates the ring or outer fitting, and C and D indicate the two tubes which are thereby joined together. The inner fitting is shown as somewhat extended at one end and interiorly tapered, at $b$, to a feather edge in order the better to take care of bending stresses at that end. When the several parts are assembled, as shown, the ring is squeezed or compressed to reduce its diameter, to thereby deform the wall of the tubes and press it into the groove in the inner member, and such reduction in the diameter of the ring is accompanied by a reduction in the thickness of its wall and an increase in its width.

The modified form of joint shown in Figs. 3 and 4 is intended to carry a tension load. Here the inner fitting $A^1$, with annular groove $a'$, is headed at its outer end and carries two integral lugs $c'$ by which it may be pivotally connected to some structural part. The end of the single tube $C^1$ is secured to the inner fitting by the ring $B^1$, which, as described, is compressed to deform the wall of the tube and to hold it seated against the bottom and sides of the groove.

In the further modification illustrated in Figs. 5 and 6, a joint intended primarily to resist torsional stresses, the inner fitting $A^2$ has a central cylindrical bearing surface $c''$, is interiorly tapered at each end $b''$, and adjacent each end has formed therein a circumferential depression $a''$, or series of milled depressions, which provides thereat a bottom or bearing surface which is polygonal in cross-section. A tube $C^2$ is joined to one end by the ring $B^2$ which, when deformed and reduced in diameter, assumes the polygonal form of the bottom of the depression in the inner member, with rounded corners. A second tube (not shown) is to be joined to the other end of the inner fitting in the same way, by another similar ring.

Certain proportions of the several parts have in practice been found to be more advantageous than others.

For instance, where the tubing and fittings are made of duralumin the wall of the inner fitting at the bottom of the circumferential depression, which preferably has a depth of between one and one-fourth and two and one-half times the wall thickness of the tube, should not be thinner than the wall of the ring. Evidently, also, if the full strength of the tube is to be developed the cross-sectional area of the inner fitting should not be less than that of the tube. The thickness of the wall of the ring, depending somewhat upon its width, is likewise preferably from one and one-fourth to to two and one-half times the thickness of the tube wall, and its width, for the best results, is from one-third to one-half the outer diameter of the tube. Narrower rings may be used, but unless very skillfully handled are apt not to seat evenly into the groove in the inner fitting when being compressed. The bottom width of the groove or depression in the inner fitting should be not less than the width of the ring plus twice the thickness of the tube, for a thin walled tube, and, in addition, up to one-half of the wall thickness more in the case of a relatively thick-walled tube.

For pure torsional stresses an inner fitting, of the inner diameter of the tube, milled to hexagonal section by a milling cutter having a diameter from four to eight times the tube wall thickness and with the sharp edges of the hexagon slightly rounded, has given excellent results. If, however, a large tension or compression loading is to be combined with considerable torsion, it is preferable to make the major diameter of the hexagon smaller than the original diameter of the tube by about one and one-half times the thickness of the tube wall. In either case the ring is reduced in size and compressed to hexagonal form with rounded corners. Forms other than six-sided polygons are obviously effective in torsion—for example, a circumferential series of partly spherical depressions, tangent at their edges, into which the wall of the tube, and the ring, is forced by means of a suitable pressing tool would afford a perfect joint.

The edges of the depression or depressions in the inner member should be rounded or filleted either on a quarter circle or, preferably, on a somewhat more elongated curve such, for instance, as an ellipse with the major axis parallel to the axis of the tube and equal to about one and one-third times the minor axis. The ring should also be filleted or rounded on its inner corners to a radius not less than three-fourths of the tube wall thickness, and, in the formation of the joint, should be compressed not merely enough to so reduce its size as to force contact of the inner wall of the tube with the bottom surface of the depression but, further, to cause a flow of the metal of the ring which will increase its original width at the outer periphery from three to fifteen per cent, the latter for relatively thick walled tubes.

Where considerable bending stress is to be resisted the inner fitting should be elongated somewhat and its walls tapered interiorly to approximately a feather edge at the end, as illustrated at one end of the inner fitting shown in Fig. 1. The extension need not be more than three-fourths wave length for short columns in compression. Such elongation and tapering of the end are not, however, essential for mainly tension loading.

In any form it is highly desirable that the inner fitting be a tight or forced fit inside the tube, and that the ring, before its compression, be a tight fit outside the tube.

Joints made as herein illustrated and described invariably develop the full strength of the tubes, and whether stressed in tension, compression, torsion, or bending, or a combination thereof, a fracture always occurs outside of, and usually at a considerable distance from, the joint.

Obviously, an interiorly grooved annular outer member into which the tube is inserted and a ring which is inserted into the tube and therein expanded to force the walls of the tube outwardly into the groove are the mechanical equivalents of the fittings described although, as is evident, of much more limited application.

What I claim as new, and desire to secure by Letters Patent, is—

1. A structural joint of the character described comprising a thin-walled tube, an inner member fitted tightly within the tube and having in its outer surface a single circumferential depression with steep sides and filleted edges and of substantially greater width than depth, and an outer metallic ring with filleted inner edges and of a width slightly less than the width of the depression which, after being slipped upon the tube and centered over the depression, has been compressed circumferentially to deform the tube wall and to hold its distinctly defined bends tightly seated upon the bottom and against the sides of the depression in the inner member.

2. A structural joint of the character described comprising a thin-walled tube, an inner tubular joint member provided in its outer surface with a circumferential depression of a depth at least equal to the thickness of the tube wall and of greater width than depth and having filleted edges which member is fitted within the tube, and an outer metallic ring of somewhat less width than the width of the depression and with filleted inner edges which, after being slipped upon the tube and centered over the depression, has been compressed circumferentially to an extent sufficient to force the tube wall into contact with the bottom of the depression and further to cause an axial flow of the metal of the ring and slightly deform the bottom of the depression.

3. A structural joint of the character described comprising a thin-walled tube, an inner member fitted within the tube which has formed in its outer surface a circumferential depression with filleted edges providing thereat a bearing surface substantially polygonal in cross section, and an outer annulus which, after being slipped upon the tube and centered over the depression, has been compressed to deform both the annulus and the tube wall to the shape of the polygonal bearing surface of the inner member and thereby to hold the tube securely seated thereon.

4. A structural joint of the character described comprising a thin-walled tube, an inner tubular member fitted tightly within the tube and having a circumferential depression with filleted upper edges and of substantially greater width than depth and internally tapered at its inner end to a feather edge bearing on the tube wall, and an outer annulus with filleted inner edges and of slightly less width than the width of the depression which, after being slipped upon the tube and centered over the depression, has been compressed to thereby deform the tube wall in distinctly defined bends and to hold it tightly seated upon the bottom and against the sides of the depression in the inner member.

CHARLES WARD HALL.